United States Patent [19]
James et al.

[11] Patent Number: 4,719,028
[45] Date of Patent: Jan. 12, 1988

[54] THERMAL ENERGY STORAGE MEDIA

[76] Inventors: Timothy W. James, P.O. Box 20091, Santa Barbara, Calif. 93120; Arnold L. Adams, P.O. Box 783, Goleta, Calif. 93116

[21] Appl. No.: 799,399

[22] Filed: Nov. 19, 1985

[51] Int. Cl.⁴ .................................................. C09K 3/18
[52] U.S. Cl. ........................................ 252/70; 252/73; 252/77; 252/78.1
[58] Field of Search ...................... 252/130, 70, 73, 77, 252/78.1; 106/271

[56] References Cited

U.S. PATENT DOCUMENTS 4,129,434 12/1978 Plumat et al. .................... 427/162 X Primary Examiner—Theodore E. Pertilla
Attorney, Agent, or Firm—Blakely, Sokoloff, Taylor, & Zafman

[57] ABSTRACT

A heat storage material is disclosed having a melting transition temperature below 5° C. The invented material comprises ethylene diamine in a mixture with non-corrosive, high heat of fusion material or materials soluble therein, so that the invented material is noncorrosive to standard metal tubing refrigeration systems.

13 Claims, 3 Drawing Figures

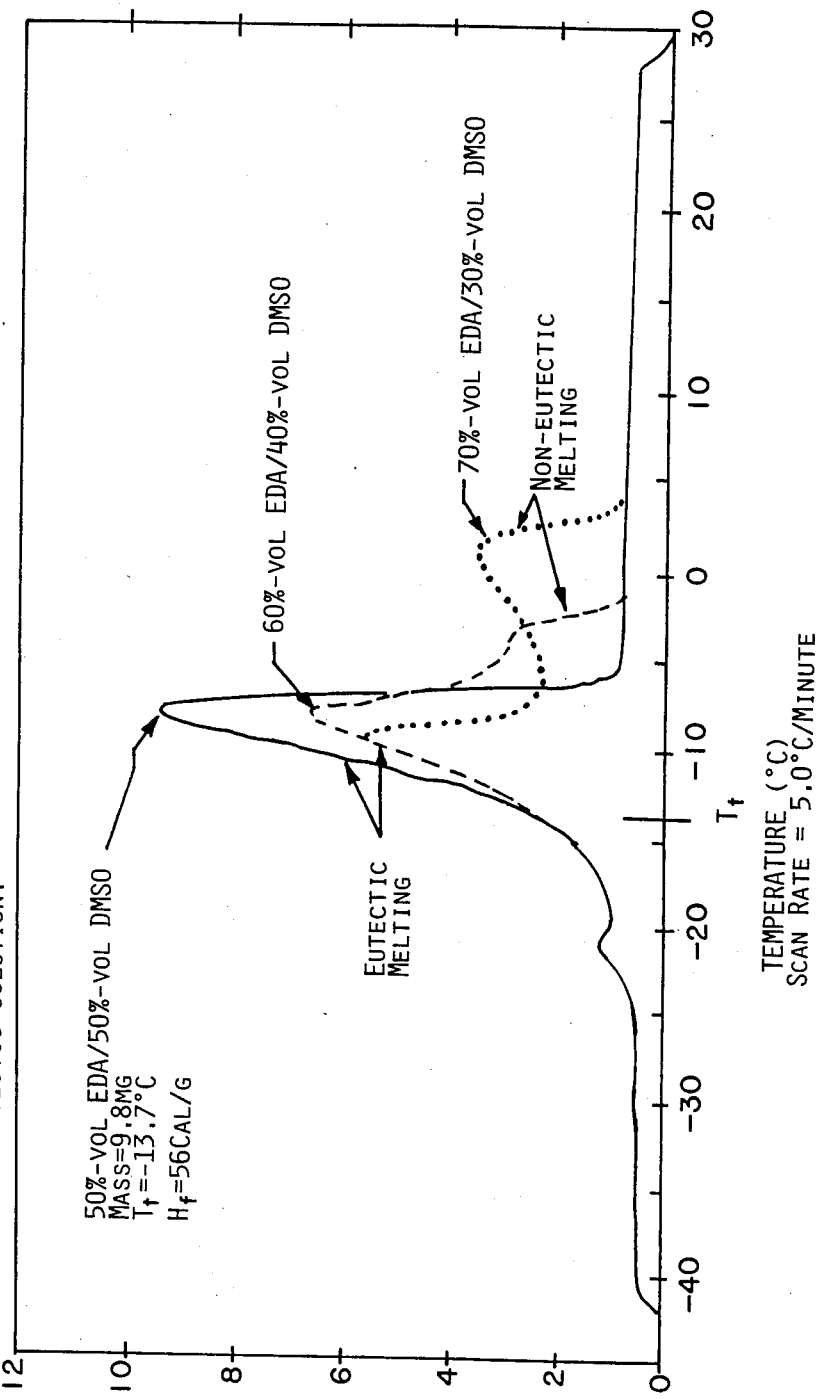
FIG. 1 DIFFERENTIAL SCANNING CALORIMETER THERMOGRAMS OF THREE SOLUTIONS OF VARYING EDA/DMSO RATIOS. THE 50%-VOL. EDA/50%-VOL. DMSO SOLUTION IS THE NEAR-EUTECTIC SOLUTION.

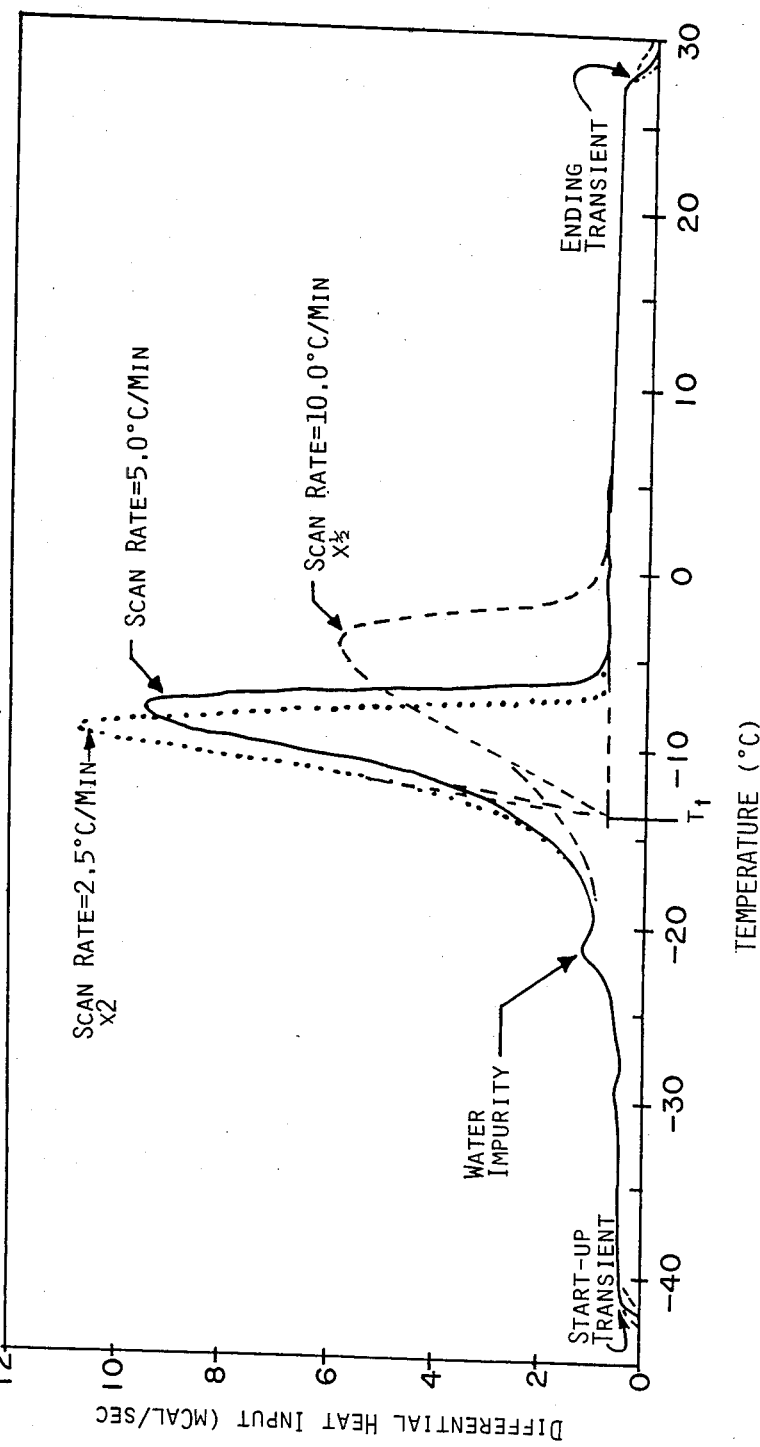

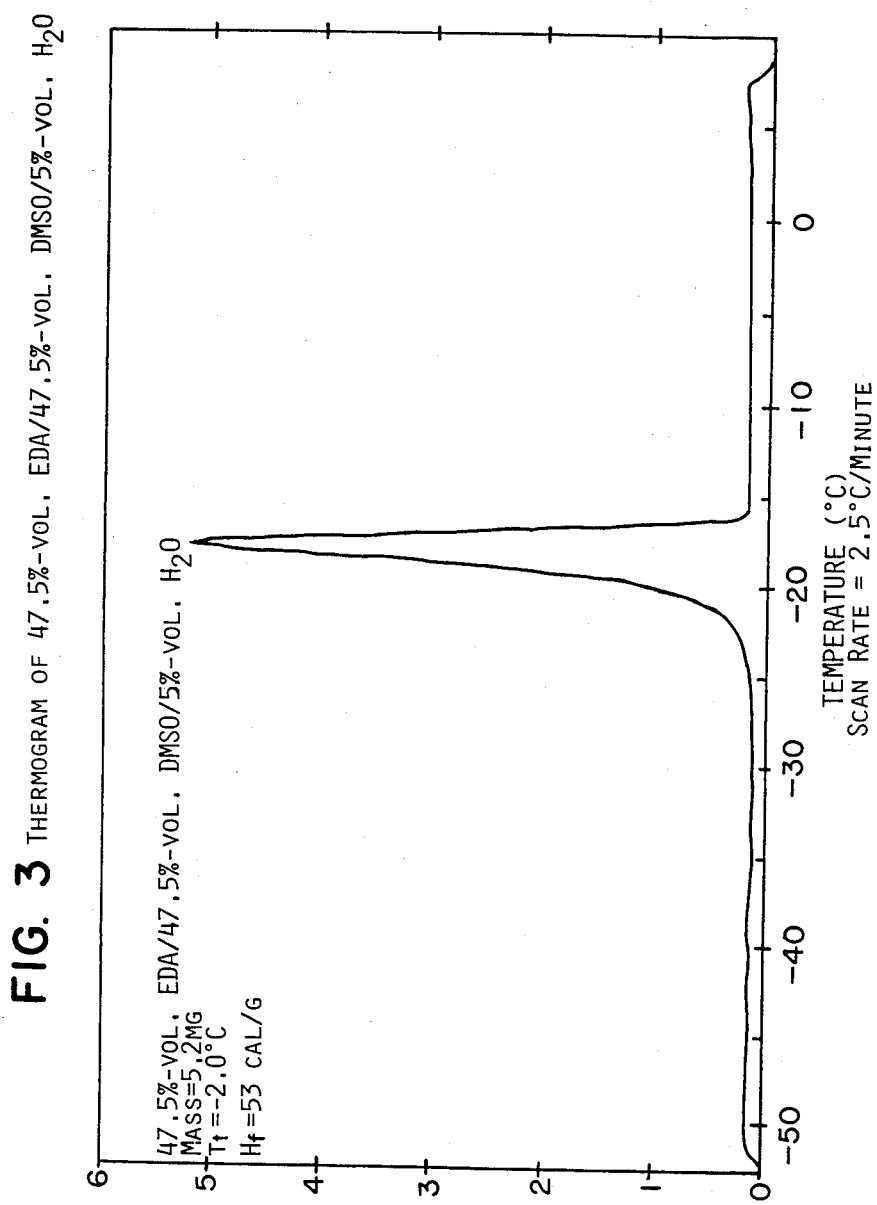

THERMAL ENERGY STORAGE MEDIA

FIELD OF THE INVENTION

The present invention relates to the field of refrigeration, and more particularly, to eutectic and near eutectic mixtures which are noncorrosive and relatively nontoxic for use in refrigeration holdover plates and related refrigeration systems.

BACKGROUND

Refrigeration units for frozen food transport trucks, and other refrigeration applications comprise generally a metal holdover plate having serpentine tubing coiled throughout the plate and a heat storage material disposed within the holdover plate and surrounding the tubing. The refrigerant, e.g. freon, $NH_3$, etc., flows through the tubing. The heat storage material used is generally a eutectic mixture. A eutectic mixture is a precise mixture of two or more substances which in combination have a single melting/freezing point, which will be referred to herein as a "transition temperature". Technically, a eutectic mixture exhibits the lowest transition temperature of solidification for any mixture of specified constituents. A near-eutectic mixture is one which has a transition temperature slightly above and a melting temperature profile somewhat broader than that of the eutectic mixture of the same components.

Holdover plates and similar refrigeration systems operate by freezing the heat storage material at a temperature specific for the particular material so that the material maintains the system at or near its transition temperature. The capacity of the heat storage material to maintain the system at a specified temperature is a function, in part, of the heat of fusion for the heat storage material, with materials having a higher heat of fusion being more capable of maintaining the specified temperature of the system for a longer period of time.

Thus, a heat storage material for a particular system is selected having a transition temperature that is at the temperature which is desired to maintain the goods, products or objects to be refrigerated.

Another factor in the ability of a holdover plate to maintain a system at a predetermined temperature is the effectiveness of the heat transfer within the holdover plate material and from the holdover plate material to the refrigerated space. Certain metals such as copper, aluminum and brass have greater heat transfer capability than other metals, such as steel, and would be more desirable materials for use in the construction of the holdover plates. However, prior art holdover plate manufacturers must take great care in their selection of the material used to manufacture the plates because there is a significant problem of plate corrosion. This corrosion problem is primarily based on the fact that the most commonly used eutectic materials in the prior art are brine solutions generally comprising a metal halide salt such as sodium chloride dissolved in water.

Although brine solutions have relatively high heats of fusion compared with other prior art heat storage materials such as glycol-water, alcohol-water, ethylene-water and propylene glycol-water, the major drawback of brine solutions is that they are extremely corrosive, and require special construction techniques to eliminate electrolytic corrosion.

For example, one prior art holdover plate is made of steel coated on its entire outer surface with hot molded zinc. All of the fittings, shell, tubing, fins, spacers and welding rods are formed of the same type of steel alloy. After forming the holdover tank, it is filled with a brine solution and then sealed under a vacuum to remove air bubbles from the brine solution and provide a small amount of space for expansion of the heat storage material contained therein. As is well known in the art, the extra care required to manufacture such holdover plates makes such plates very expensive, although less so than utilizing all stainless steel parts in the holdover plates. It is primarily the corrosive nature of the brine solutions used in prior art holdover plates which requires the special care.

Two prior art patents described the use of ethylene diamine as a heat storage material, namely Hill, et al U.S. Pat. Nos. 2,327,041 and 2,333,862. However, both patents only disclose the use of ethylene diamine for temperatures in the range of 32° F. to 50° F. which is substantially above temperatures considered effective for transporting frozen foods.

The disadvantages of the prior art heat storage materials discussed above have been overcome in the present invention, which is described below.

SUMMARY OF THE INVENTION

The present invention is a eutectic or near eutectic mixture having a sharply defined melting transition temperature below 5° C., depending upon the specific constitution of the mixture. In the most general form, the heat storage material disclosed herein comprises ethylene diamine with another material or materials dissolved therein, the net solution having a high heat of fusion. More particularly, the invented heat storage material comprises ethylene diamine mixed with a noncorrosive material or materials such as dimethyl sulfoxide and/or dimethyl sulfone and/or $H_2O$, and/or paraffin mixed with detergent (to permit the paraffin to dissolve in the ethylene diamine), and/or phenyl salicylate and the like. An example of such an eutectic material is a 50%/50% by volume mixture of ethylene diamine and dimethyl sulfoxide having a eutectic transition temperature of $-14°$ C. and a heat of fusion of 56 calories per gram.

The invented heat storage material is contemplated as being useful in holdover plates and other similar refrigeration applications, and has a heat of fusion similar to that of brine solutions of the prior art. The invented heat storage material is non-corrosive, and therefore can be used with otherwise corrodable metals used in the holdover tank, some of which are less expensive, and even more important, have a higher heat transfer capacity than prior art systems which must be specifically designed and constructed to eliminate corrosion. Moreover, ethylene diamine has the capacity to passivate many metals thus making the holdover tank or other refrigeration system even less apt to be corroded. DMSO is also a useful passivant, particularly in systems containing copper. In addition, the invented heat storage material has no expansion upon freezing so that softening agents need not be used and holdover plate construction and filling will be simpler.

Another advantage is that our class of holdover materials provides transition temperatures not covered by the prior art (See Table I). This allows a closer match of eutectic holdover plate material transition temperature to the required refrigerated space temperature yielding greater overall refrigeration efficiency

BRIEF DESCRIPTION OF THE DRAWINGS

FIG. 1 is a differential scanning calorimeter thermogram of three solutions with different EDA/DMSO ratios.

FIG. 2 is a differential scanning calorimeter thermogram of a 50% ethylene diamine/50% dimethyl sulfoxide mixture showing the effect of scanning at three different temperature scan rates.

FIG. 3 is a differential scanning calorimeter thermogram of another embodiment of the invented heat storage material.

DETAILED DESCRIPTION

The present invention is a class of high heat of fusion, noncorrosive eutectic or near-eutectic mixtures comprising ethylene diamine in combination with another material or materials having similar characteristics. More specifically, the present invention is directed to heat storage materials which are eutectic or near eutectic and thus have a narrow melting temperature profile, and which have a melting transition temperature below 5° C. Such materials are particularly useful in holdover plates and other refrigeration systems in which subfreezing or near freezing temperatures are desired.

Ethylene diamine is an amine compound having a latent heat of fusion comparable to the heat of fusion of water. Ethylene diamine eutectic solutions have equivalent heats of fusion to those of present refrigerant holdover plate solutions based on aqueous metal-halide salt solutions (brine) and far exceed heat storage capacity of glycol-water solutions.

The other material or materials to be mixed with the ethylene diamine can be any of a large number of materials capable of dissolving in ethylene diamine to form effective heat storage materials. The preferred materials to be mixed with ethylene diamine in the present invention are determined based on the following considerations: the eutectic temperature of the mixture, sharpness of the melting transition, the heat of fusion of the eutectic mixture, the corrosivity/ability to passivate of the resultant mixture, the cost of the substance(s), toxicity, the difficulty in preparing the mixture, and reactivity with other constituents. Ethylene diamine eutectic solutions (particularly solutions containing DMSO) are not only noncorrosive, but also passivate metals used in holdover plates. This allows greater latitude in holdover plate materials selection and construction techniques than is possible with brine solutions, which are inherently very corrosive or glycol-water, which are moderately corrosive even when passivated with ethylene diamine. Thus, using the present invention as a heat storage material, the material selection and construction techniques of the holdover plate or other system refrigeration may be chosen in consideration of factors such as ease of fabrication, material, cost, esthetics, improved heat transfer and weight, rather than solely for corrosion compatibility with brines.

Because of the noncorrosive nature of the ethylene diamine/DMSO eutectic solutions of the present invention, mass-produced fin/tube heat storagers, typically fabricated from corrodable copper tubes and aluminum or copper fins which are silver soldered together, may now be used for the primary refrigerant, rather than the custom-made heat storagers presently used with brine solutions. This provides greater heat transfer from primary refrigerant to freezing holdover solution during refreezing (regeneration) over that of the current technology utilized in brine plates.

Improved heat transfer from the primary refrigerant to the eutectic solution during freezing provides several significant advantages, primarily that of an improved coefficient of performance (COP) of the refrigeration system. The theoretical maximum COP a refrigeration system can achieve operating between $T_2$ and $T_1$ is $E_c = T_1/(T_2 - T_1)$ called the Carnot COP, with temperature defined in Kelvin. In a prior art brine system, operation of a 313 K (40° C.) ($T_2$) condensing temperature and an evaporating temperature of 243 K ($-30°$ C.) ($T_1$) the $E_c$ is 3.5. A 10° C. increase in the evaporating temperature can be achieved by increased heat transfer with fin/tube evaporators so that $E_c = 4.2$, which amounts to a 20% improvement. Even greater heat transfer increases would be expected as a result of the noncorrosive and passivating properties of the present invention, with the amount of such improvement depending on the details of the plate design.

Additional improvement in COP of ethylene diamine solution heat storage materials relative to corrosive solutions would also be realized because the fin/tube assembly, not generally usable with corrosive brine solutions, also increases heat transfer from the plate to the refrigerated space, both during eutectic freezing and refrigeration by the eutectic melting. Improved heat transfer to the refrigerated space allows a higher temperature eutectic solution to be used while maintaining the same temperature and refrigeration capacity in the refrigerated space. The use of a higher temperature eutectic has the effect of raising the required evaporating temperature of the primary refrigerant, which increases the COP and refrigerating capacity for a given compressor and condensor, or, alternatively, reduces the size and cost of the compressor and condensor required for the same refrigerating capacity.

Another advantage of the present invention is that the solid phase of most ethylene diamine solutions has nearly the identical density to the liquid phase as compared with water-based solutions which expand up to 10% on freezing. Thus, water-based systems require either a flexible container, and/or softening agents, and/or vacuum space must be provided when filling the container to avoid stressing the container and piping upon freezing. In addition, the commonly used softening agents reduce the overall refrigeration efficiency by broadening the transition temperature and reducing the amount of usable solution for heat storage because some of the softening agent is prevented from freezing to effect softening.

As compared to currently available eutectic solutions, etuectic ethylene diamine solutions generally have a narrower temperature range over which the freezing transition occurs. Ethylene diamine eutectic solutions can be made without adding corrosion inhibitors, softening agents, and the like, which broaden the transition temperature of brine solutions. Glycol-water solutions already have broad transition temperatures, in addition to low heats of fusion.

The transition temperatures of several ethylene diamine-based mixtures are commercially useful. As set forth in the examples below, heat storage materials having transition temperatures in the $-13°$ C. to $-22°$ C. range are disclosed which is not well covered by brine solutions (See Table I). For example, eutectic sodium chloride water solutions have a transition temperature of about $-23°$ C. The range of temperatures for ethylene diamine eutectics is important because it is the ideal range for most frozen foods. For example, the "dipping" temperature of ice cream is −13° C. Moreover, the efficiencies of refrigeration systems decrease as temperature decreases, so that an ethylene diamine system would likely be more efficient than a brine system, depending upon the particular application (i.e., depending upon the required temperature of the refrigerated space).

TABLE I

A partial listing of a few examples of the disclosed eutectic mixtures and examples of the prior art. The transition temperature and heat of fusion of each mixture is also tabulated.

| SOLUTION COMPOSITION | EUTECTIC TRANSITION TEMPERATURE | HEAT OF FUSION (cal/g) |
|---|---|---|
| 50% Ethylene diamine + 50% Dimethylsulfoxide | −14° C. | 56 |
| 47.5% Ethylene diamine + 47.5% Dimethylsulfoxide + 5% Water | −20° C. | 53 |
| 49% Ethylene diamine + 49% Dimethylsulfoxide + 2% Dimethylsulfone | −18° C. | 50 |
| 80% Ethylene diamine + 15% N—dodecane (paraffin) + 5% Triton (detergent) (mass) | +5° C. | 70 |
| 41% Ethylene diamine + 41% Dimethylsulfoxide + 13% Dimethylsulfone + 5% Water | −22° C. | 48 |
| 20% KCl + 80% Water (mass)* | −6° C. | 76 |
| 23% NaCl + 77% Water (mass)* | −23° C. | 55 |
| 30% CaCl$_2$ + 70% Water (mass)* | −55° C. | 47 |
| 40% ± 20% Glycol + 60% ± 20% Water (mass)* | −15° C. to −40° C. | 22 cal/gm integrated over entire transition |

[*indicates examples of the prior art].

EXAMPLE 1

Mixtures of ethylene diamine and dimethyl sulfoxide.

A 50% volume of ethylene diamine is mixed with 50% volume of dimethyl sulfoxide in a dry environment to form a eutectic solution having a heat of fusion of 56 cal/gm and a sharp freezing transition temperature at −14° C. (6° F.). Adding dimethyl sulfoxide to ethylene diamine not only produces a solution of high heat of fusion at a commerically important temperature, but also acts as an excellent corrosion inhibitor, especially in systems containing copper. Other concentrations may be used but the further a given solution is from the eutectic concentration, the broader will be the melting/freezing transition profile, as shown in FIG. 1 and discussed below. An ill-defined transition temperature will cause a reduction in the net cooling capacity available at the principal transition temperature because of the loss in $E_c$ as discussed above.

FIG. 1 illustrates this effect for several concentrations of dimethyl sulfoxide in ethylene diamine. Specifically a 70% ethylene diamine/30% dimethyl sulfoxide mixture and 60% ethylene diamine/40% dimethyl sulfoxide mixture are shown, as well as a 50% ethylene diamine/50% dimethyl sulfoxide mixture. The thermogram of FIG. 1, obtained with a differential scanning calorimeter, shows the heat input per unit time to a small sample of known mass necessary to effect a small increment in temperature per unit time. The offset from zero at a given temperature not near a peak is proportional to a sample's specific heat at that temperature. The area under a peak is proportional to the sample's heat of fusion ($H_f$). The transition temperature ($T_t$) is obtained by extrapolating the leading edge of a peak to the onset of the transition. As FIG. 1 clearly shows, the 50%/50% mixture provides the narrowest transition profile, the 60%/40% mixture provides an intermediate breadth transition profile and 70%/30% provides an even broader profile.

Thermograms of solutions with near-ideal transitions (ones which occur precisely at one temperature) have non-zero peak widths which are proportional to the temperature scan rate. By measuring one sample at different scan rates it is possible to determine the sharpness of a transition. For comparison, FIG. 2 shows a thermogram for a 50% ethylene diamine/50% dimethyl sulfoxide eutectic solution at three scan rates. As shown, the peaks become sharper as temperature scan rate is decreased. Unlike glycol-water solutions, ethylene diamine-dimethyl sulfoxide solutions near the eutectic concentration (roughly 50% volume ethylene diamine) have sharp transitions with little melting occuring at temperature not near the transition temperature.

EXAMPLE 2

Mixtures of ethylene diamine, dimethyl sulfoxide and water.

Ternary near-eutectic solutions of ethylene diamine, dimethyl sulfoxide and water can be formed by mixing 48%±5% volume ethylene diamine with 48%±5% volume dimethyl sulfoxide with 4%±3% volume water. The thermogram for one of these solutions is shown in FIG. 3. As expected, the ternary eutectic solution melts/freezes at a lower temperatures than the binary solution. The ternary has a transition temperature of −20° C. (−6° F.) and a heat of fusion of 53 cal/gm. This is a near-ideal temperature for deep-freezing.

EXAMPLE 3

Mixtures of dimethyl sulfoxide, dimethyl sulfone and ethylene diamine.

See Table 1.

EXAMPLE 4

Mixtures of ethylene diamine, dimethyl sulfoxide, dimethyl sulfone and water.

See Table 1.

EXAMPLE 5

Mixtures of ethylene diamine with other materials.

Many other materials may be dissolved in ethylene diamine to produce noncorrosive, high heat of fusion solutions with various transition temperatures. For example, many paraffins have high heats of fusion and, with the aid of a detergent such as Triton, may be dissolved in ethylene diamine. Also, dimethyl sulfone, which is even less toxic than dimethyl sulfoxide, can be used to produce a noncorrosive, high heat of fusion solution with ethylene diamine. See Table 1 for one example, comprising 80% ethylene diamine (by mass), 15% n-dodecane (by mass) and 5% Triton detergent (by mass).

For comparison, certain embodiments of the invented heat storage materials are listed in Table 1 along with relevant data for prior art storage materials. It will be appreciated by one skilled in the art that the invented materials have heats of fusion comparable to and in some instances, better than the prior art materials. Moreover, by carefully selecting the material to be mixed with ethylene diamine, a material having a transition temperature below +5° C. can be obtained.

In addition to the use of the invented material in holdover plates, other uses are contemplated as well. For example, the material can be provided in refrigerators for home, camping and boat use. With respect to home refrigeration units, it may be possible to have the refrigerator compressor turned off during peak electricity demand time during the day so that the refrigerator only draws electric current during off peak hours. With respect to boating and camping uses, it is contemplated that a refrigeration system can operate for an extended period of time, subject to ambient conditions, without requiring any outside power source.

It will be obvious to one of ordinary skill in the art that many modifications and substitutions can be made to the present invention without departing from the nature and scope thereof. In particular, the inventors contemplate that a large number of materials can be mixed with ethylene diamine to form the invented eutetic solutions contemplated herein.

We claim:

1. A generally noncorrosive heat storage material having a melting temperature below 5° C. consisting essentially of:
   30% to 80% ethylene diamine;
   20% to 70% of a material having a heat of fusion in the range of 20 cal/g to 200 cal/g, whereby said material is noncorrosive to metal; and 0% to 20% water.

2. The heat storage material of claim 1 wherein said non-corrosive material is selected from the group consisting of dimethylsulfoxide, dimethylsulfone and paraffins mixed with sufficient amounts of detergent to form a solution with said ethylene diamine.

3. The heat storage material claim 2 consisting essentially of equal volumes of ethylene diamine and dimethylsulfoxide.

4. The heat storage material of claim 3 further comprising 1% to 7% water by volume.

5. The heat storage material of claim 2, wherein said non-corrosive material consisting essentially of approximately equal volumes of ethylene diamine and dimethyl sulfone, and has a transition temperature of approximately 5° C.

6. The heat storage material of claim 5 further comprising 1% to 7% water by volume.

7. The heat storage material of claim 1 wherein said non-corrosive material consisting essentially of paraffin and a detergent for rendering paraffin soluble in said ethylene diamine.

8. The heat storage material of claim 7 comprising by mass, approximately:
   80% ethylene diamine;
   15% n-dodecane; and
   5% triton detergent.

9. A eutectic mixture suitable for use as a heat storage material for frozen storage, said mixture having a melting temperature which remains substantially constant during change of state thereof from solid to liquid, said melting temperature being below 5° C., said eutectic mixture comprising approximately by volume:
   41% to 53% ethylene diamine;
   41% to 53% of dimethyl sulfoxide; and
   0% to 18% of an additive selected from the group consisting of dimethyl sulfone, water and mixtures thereof.

10. The heat storage material of claim 9 comprising approximately by volume:
    50% ethylene diamine; and
    50% dimethyl sulfoxide.

11. The heat storage material of claim 9 comprising by volume:
    48% ±5% ethylene diamine;
    48% 5 ±5% dimethyl sulfoxide; and
    4%±3% water.

12. The heat storage material of claim 9 comprising approximately by volume:
    41% ethylene diamine;
    41% dimethyl sulfoxide;
    13% dimethyl sulfone; and
    5% water.

13. A heat storage material for use in holdover plates comprising corrodable metals, said heat storage material comprising eutectic material as claimed in any of claims 1–12.

* * * * *